US010533676B2

United States Patent
Kokubu et al.

(10) Patent No.: US 10,533,676 B2
(45) Date of Patent: Jan. 14, 2020

(54) THROTTLE DEVICE AND METHOD FOR MANUFACTURING THE SAME

(71) Applicant: AISAN KOGYO KABUSHIKI KAISHA, Obu-shi, Aichi-ken (JP)

(72) Inventors: Toshihide Kokubu, Obu (JP); Yoshiki Ito, Nagoya (JP); Shinya Yamaguchi, Kariya (JP)

(73) Assignee: AISAN KOGYO KABUSHIKI KAISHA, Obu-Shi, Aichi-Ken (JP)

( * ) Notice: Subject to any disclaimer, the term of this patent is extended or adjusted under 35 U.S.C. 154(b) by 122 days.

(21) Appl. No.: 15/696,349

(22) Filed: Sep. 6, 2017

(65) Prior Publication Data
US 2018/0066763 A1 Mar. 8, 2018

(30) Foreign Application Priority Data

Sep. 7, 2016 (JP) .................................. 2016-174599

(51) Int. Cl.
F16K 31/04 (2006.01)
F16K 1/22 (2006.01)
(Continued)

(52) U.S. Cl.
CPC ............ *F16K 31/043* (2013.01); *F16K 1/221* (2013.01); *F02D 9/08* (2013.01); *F02M 35/10255* (2013.01)

(58) Field of Classification Search
CPC .......... F16K 31/043; F16K 1/221; F02D 9/08; F02M 35/10255
(Continued)

(56) References Cited

U.S. PATENT DOCUMENTS 4,702,123 A * 10/1987 Hirao ...................... F16F 9/462
188/266.4
4,951,772 A * 8/1990 Peter ...................... B60K 28/16
123/361
(Continued)

FOREIGN PATENT DOCUMENTS

JP H05214968 A 8/1993
JP H0642376 A 2/1994
(Continued)

OTHER PUBLICATIONS

Japanese Office Action dated Aug. 29, 2019, for Japanese Application No. 2016-174599 (5 p.).
(Continued)

Primary Examiner — Seth W. Mackay-Smith
(74) Attorney, Agent, or Firm — Conley Rose, P.C.

(57) ABSTRACT

The throttle device 1 includes a throttle body 10 having an intake passage 11, a throttle valve 12 arranged to rotate within the intake passage 11 for opening and closing the intake passage 11, and a throttle shaft 13 rotatably arranged with respect to the throttle body 10 which is integrally formed with and concomitantly rotatable with the throttle valve 12. A throttle gear 16 is fixed to the throttle shaft 13 and rotated by the actuator. A spring 20 biases the throttle gear 16 in a predetermined initial opening angle. A full-close stopper 15 is provided in the throttle body 10. The full-close stopper 15 restricts the throttle gear 16, which rotates in the opening and closing directions, from rotating past the fully closed angle position. A stopper member 20f is formed at the spring. An initial-open stopper 18 is provided in the throttle body 10 to restrict the stopper member 20f from rotating past the initial opening angle. A fully closed opening angle restricting member 14 is fixed to the throttle shaft 13 in a
(Continued)

position where the fully closed opening angle restricting member 14 contacts the full-close stopper 15.

7 Claims, 11 Drawing Sheets

(51) Int. Cl.
*F02D 9/08* (2006.01)
*F02M 35/10* (2006.01)

(58) Field of Classification Search
USPC .......................................... 251/129.12, 284
See application file for complete search history.

(56) References Cited

U.S. PATENT DOCUMENTS

| | | | | |
|---|---|---|---|---|
| 4,961,355 | A * | 10/1990 | Irino | F02D 11/04 123/198 D |
| 5,018,496 | A * | 5/1991 | Buchl | F02D 11/10 123/361 |
| 5,429,090 | A * | 7/1995 | Kotchi | F02D 9/02 123/396 |
| 5,492,097 | A * | 2/1996 | Byram | F02D 9/02 123/396 |
| 5,752,484 | A * | 5/1998 | Apel | F02D 9/02 123/396 |
| 5,775,292 | A * | 7/1998 | Seeger | F02D 11/107 123/396 |
| 6,050,241 | A * | 4/2000 | Reiling | F02D 11/107 123/396 |
| 6,070,852 | A * | 6/2000 | McDonnell | F02D 9/02 123/396 |
| 6,164,623 | A * | 12/2000 | Ito | F02D 9/1065 123/337 |
| 6,253,732 | B1 * | 7/2001 | Semeyn, Jr. | F02D 9/02 123/396 |
| 6,299,545 | B1 * | 10/2001 | Perry | B29C 45/14311 403/359.6 |
| 6,332,451 | B1 | 12/2001 | Sato et al. | |
| 6,364,287 | B1 * | 4/2002 | Rauch | F02D 9/1065 137/315.22 |
| 6,488,009 | B2 * | 12/2002 | Sakurai | F02D 9/02 123/361 |
| 6,543,417 | B2 * | 4/2003 | Tanaka | F02D 11/10 123/361 |
| 6,575,427 | B1 * | 6/2003 | Rauch | F02D 9/1065 123/339.15 |
| 6,912,994 | B2 * | 7/2005 | Ozeki | F02D 9/1065 123/337 |
| 6,913,241 | B2 * | 7/2005 | Bernarding | F01P 7/167 251/129.12 |
| 7,080,628 | B2 * | 7/2006 | Kado | F02D 11/10 123/399 |
| 10,125,696 | B2 * | 11/2018 | Gangler | F02D 11/06 |

FOREIGN PATENT DOCUMENTS

| | | |
|---|---|---|
| JP | 2001003770 A | 1/2001 |
| JP | 2002-371866 A | 12/2002 |
| JP | 2005-147012 A | 6/2005 |
| JP | 2006-046318 A | 2/2006 |
| JP | 200810151 A | 5/2008 |
| JP | 2009185679 A | 8/2009 |
| JP | 2011163143 A | 8/2011 |

OTHER PUBLICATIONS

English Translation of Japanese Office Action dated Aug. 29, 2019, for Japanese Application No. 2016-174599 (7 p.).

\* cited by examiner

THROTTLE DEVICE AND METHOD FOR MANUFACTURING THE SAME

CROSS-REFERENCE TO RELATED APPLICATIONS

This application claims priority to Japanese patent application serial number 2016-174599 filed Sep. 7, 2016, the contents of which are incorporated herein by reference in their entirety for all purposes.

STATEMENT REGARDING FEDERALLY SPONSORED RESEARCH OR DEVELOPMENT

Not applicable.

BACKGROUND

This disclosure relates to throttle devices for adjusting the amount of air flow through an engine's air intake system, and methods for manufacturing the same.

An example of a conventional throttle device (for example, Japanese Laid-Open Patent Publication No. 2002-371866) will now be described. As shown in FIG. 21, a throttle device 110 includes a throttle body 111, a motor 112 and a reduction gear mechanism, wherein the reduction gear mechanism includes a motor pinion 112p, a counter gear 113 and a throttle gear 114. The throttle gear 114 is integrally attached to a throttle shaft 120. The motor 112 rotates the throttle shaft 120 via the reduction gear mechanism so that a throttle valve attached on the throttle shaft 120 is rotated. As a result of the throttle valve rotation, the amount of intake air flowing through an intake passage in the throttle body can be adjusted.

A spring member 115 is interposed between the throttle gear 114 and the throttle body 111. The spring member 115 is configured to bias the throttle gear 114 to an initial opening angle.

The throttle body 111 is provided with a screw 116 and a screw 117. The screw 116 is a fully closed opening angle restricting screw for restricting a fully closed angle of the throttle valve (throttle gear 114). The screw 117 is an initial opening angle restricting screw for restricting the initial opening angle of the throttle valve. The throttle gear 114 includes a gear stopper 114a that is able to abut the fully closed opening angle restricting screw 116 such that the throttle gear 114 is restricted from rotating past a fully closed angle. The spring member 115 includes a stopper 115a that is able to abut the initial opening angle restricting screw 117 such that the throttle gear 114 is restricted from rotating past an initial opening angle. The fully closed opening angle restricting screw 116 may be moved forward or backward for the fully closed angle to be adjusted, respectively. Similarly, the initial opening angle restricting screw 117 may be moved forward or backward for the initial opening angle to be adjusted, respectively.

According to the conventional throttle device, the fully closed opening angle restricting screw 116 and the initial opening angle restricting screw 117 components are necessary to ensure the accuracy of the fully closed angle and the initial opening angle. For this purpose, a large number of components are employed for conventional throttle devices, which consequently result in complexity, high cost of manufacturing, and additional need for maintenance.

BRIEF SUMMARY

According to one aspect of the present disclosure, a throttle device includes a throttle body with an intake passage, a throttle valve disposed in the intake passage for opening and closing the intake passage, and a throttle shaft rotatably arranged with respect to the throttle body where the throttle shaft is integrally assembled with the throttle valve, and rotates along with the throttle valve. Further, the throttle device includes a throttle gear fixed to the throttle shaft via an initial opening angle restricting member and rotatably driven by an electric actuator and a spring that biases the throttle gear to a predetermined initial opening angle. Further, the throttle device has a full-close stopper, an initial-open stopper, a fully closed opening angle restricting member, and an initial opening angle restricting member. The full-close stopper is provided on the throttle body to restrict the throttle gear that rotates in opening and closing directions, from rotating past a fully closed angle. The initial-open stopper is provided on the throttle body to restrict a stopper member of the spring from rotating past an initial opening angle of the stopper member. The fully closed opening angle restricting member is fixedly attached to the throttle shaft in a position where it can abut the full-close stopper. The initial opening angle restricting member fixes the throttle gear on the throttle shaft in a position where the stopper member abuts the initial-open stopper.

Therefore, in this manner, embodiments of the throttle device may not need the extraneous components found in conventional devices such as a fully closed opening angle restricting screw and a conventional initial opening angle restricting screw, where the positions of those screws are adjusted with respect to the throttle body. Therefore, the number of components as well as the cost/maintenance for throttle devices can be reduced while maintaining a high degree of accuracy of the fully closed angle and the initial opening angle.

In another aspect of the disclosure, the fully closed opening angle restricting member and the initial opening angle restricting member may be separate members. The throttle shaft includes an attachment part having a circular shaft shape to which the fully closed opening angle restricting member and the initial opening angle restricting member may be attached. The fully closed opening angle restricting member and the initial opening angle restricting member have a circular hole through which the attachment part of the throttle shaft is inserted.

Another aspect of the disclosure relates to a method for manufacturing a throttle device in which a throttle shaft attached to a throttle valve is rotatably mounted on a throttle body such that the throttle valve is installed within an intake passage of the throttle body. A fully closed opening angle restricting member is rotatably mounted on the throttle shaft. The fully closed opening angle restricting member is fixed to the throttle shaft while the throttle valve is in a fully closed angle, and the fully closed opening angle restricting member is in a position where the fully closed opening angle restricting member abuts a full-close stopper of the throttle body. A throttle gear is rotatably mounted on the throttle shaft along with a spring which biases the throttle gear to a predetermined initial opening angle position. A stopper member provided with the spring abuts an initial-open stopper of the throttle body that restricts the stopper member provided with the spring from rotating past an initial opening angle. An initial opening angle restricting member of the throttle gear is attached to the throttle shaft in a position where the stopper member provided with the spring abuts the initial-open stopper of the throttle body.

Consequently, embodiments of the throttle device may not need a conventional fully closed opening angle restricting screw and a conventional initial opening angle restricting screw, where those screws found with conventional devices may need to be adjusted in their positions with respect to the throttle body. Therefore, the number of components as well as the cost/maintenance for throttle devices can be reduced, while an accuracy of the fully closed angle and the initial opening angle can be ensured.

Another aspect of the disclosure relates to several methods for manufacturing a throttle device. In a first example, a throttle shaft, which is attached to a throttle valve, is rotatably mounted on a throttle body such that the throttle valve is installed in an intake passage of the throttle body. The throttle valve, rotatable in opening and closing directions with respect to the throttle body, abuts an inner wall of the intake passage. A fully closed opening angle restricting member that is rotatable with respect to the throttle body abuts a full-close stopper of the throttle body. The throttle valve is rotated to an open angle corresponding to the sum of the angles of a fully closed opening angle and an initial opening angle from the state where the throttle valve abuts an inner wall of the intake passage. The fully closed opening angle corresponds to an opening angle of the throttle valve when the fully closed opening angle restricting member abuts the full-close stopper, and the initial opening angle corresponds to an opening angle of the throttle valve when no external force is applied to the throttle shaft. A throttle gear is rotatably mounted on the throttle shaft along with a spring that biases the throttle gear to the initial opening angle. A stopper member provided with the spring is abuts an initial-open stopper of the throttle body that restricts the stopper member provided with the spring from rotating past the initial opening angle. An initial opening angle restricting member and the fully closed opening angle restricting member of the throttle gear are fixed to the throttle shaft in a position where the stopper member provided with the spring abuts the initial-open stopper.

In another example, a throttle shaft, to which a throttle valve is attached, is rotatably mounted on a throttle body such that the throttle valve is installed in an intake passage of the throttle body. The throttle valve rotatable in the opening and closing directions is rotatably mounted on the throttle shaft and is rotated to a fully closed angle where a fully closed opening angle restricting member rotatably mounted on the throttle shaft abuts a full-close stopper of the throttle body. The throttle valve is rotated to an initial opening angle while the throttle shaft and the fully closed opening angle restricting member are maintained in a relatively non-rotatable manner. An initial opening angle corresponds to an initial opening angle of the throttle valve when no external force is applied to the throttle shaft. A throttle gear is rotatably mounted on the throttle shaft along with a spring which biases the throttle gear to the initial opening angle. A stopper member of the spring abuts an initial-open stopper of the throttle body wherein the initial-open stopper restricts the stopper member provided with the spring from rotating past the initial opening angle while the throttle valve is in an initial opening angle. The fully closed opening angle restricting member and an initial opening angle restricting member of the throttle gear are fixed to the throttle shaft.

In an additional example, a throttle shaft, to which a throttle valve is attached, is rotatably mounted on a throttle body such that the throttle valve is installed in an intake passage of the throttle body. A throttle gear is rotatably mounted on the throttle shaft along with a spring which biases the throttle gear to a predetermined initial opening angle. A stopper member of the spring abuts an initial-open stopper of the throttle body, wherein the initial-open stopper restricts the stopper member from rotating past the initial opening angle. The throttle valve is rotated to a fully closed angle while the throttle shaft and an initial opening angle restricting member of the throttle gear are maintained in a relatively non-rotatable manner. A fully closed opening angle restricting member, which is rotatably mounted on the throttle shaft, abuts a full-close stopper of the throttle body while the throttle valve is in a fully closed angle position. The fully closed opening angle restricting member and the initial opening angle restricting member are fixed to the throttle shaft.

DETAILED DESCRIPTION

Figure 1:
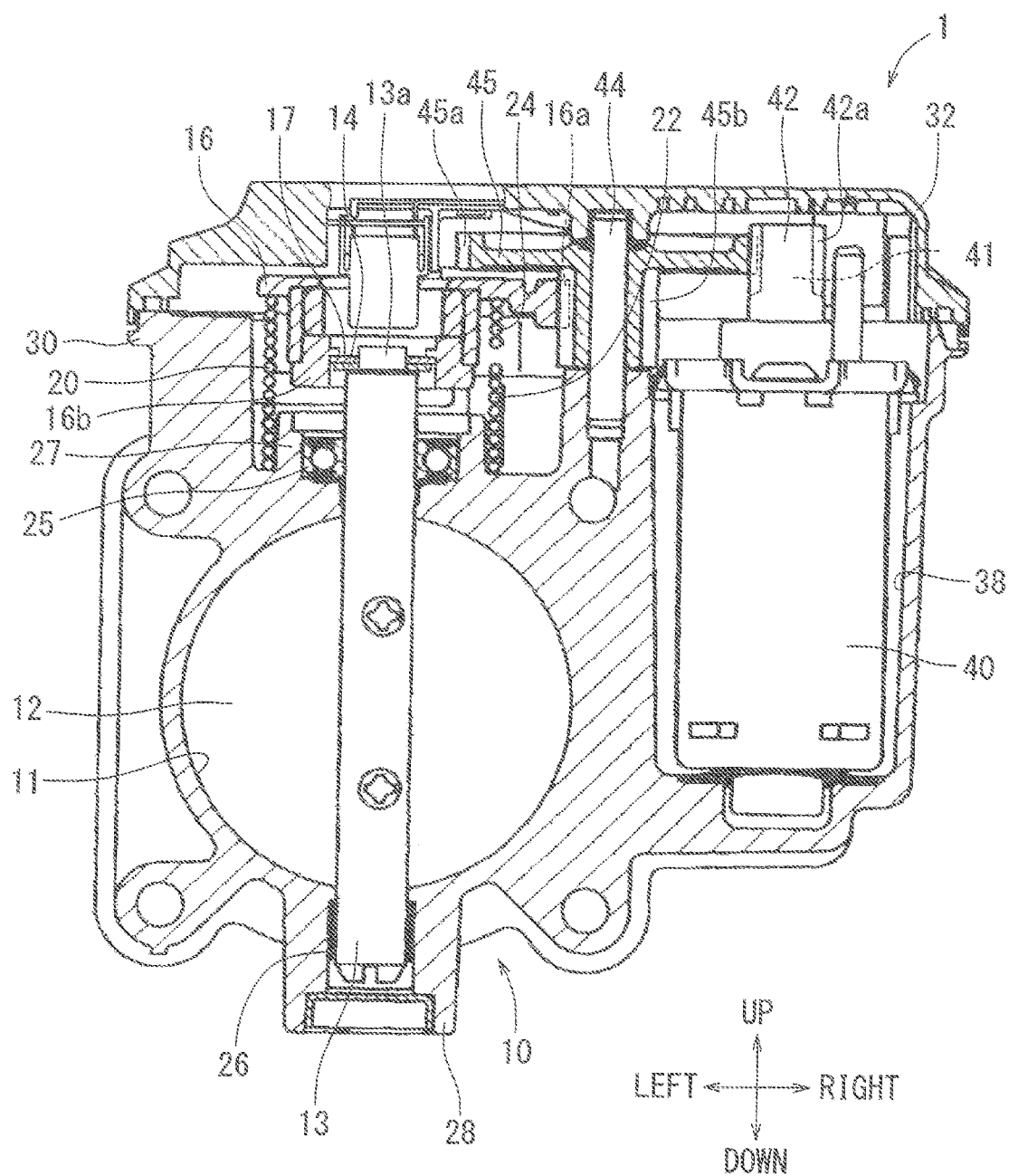
FIG. 1 is a cross-sectional view of a throttle device according to an embodiment.
Figure 2:
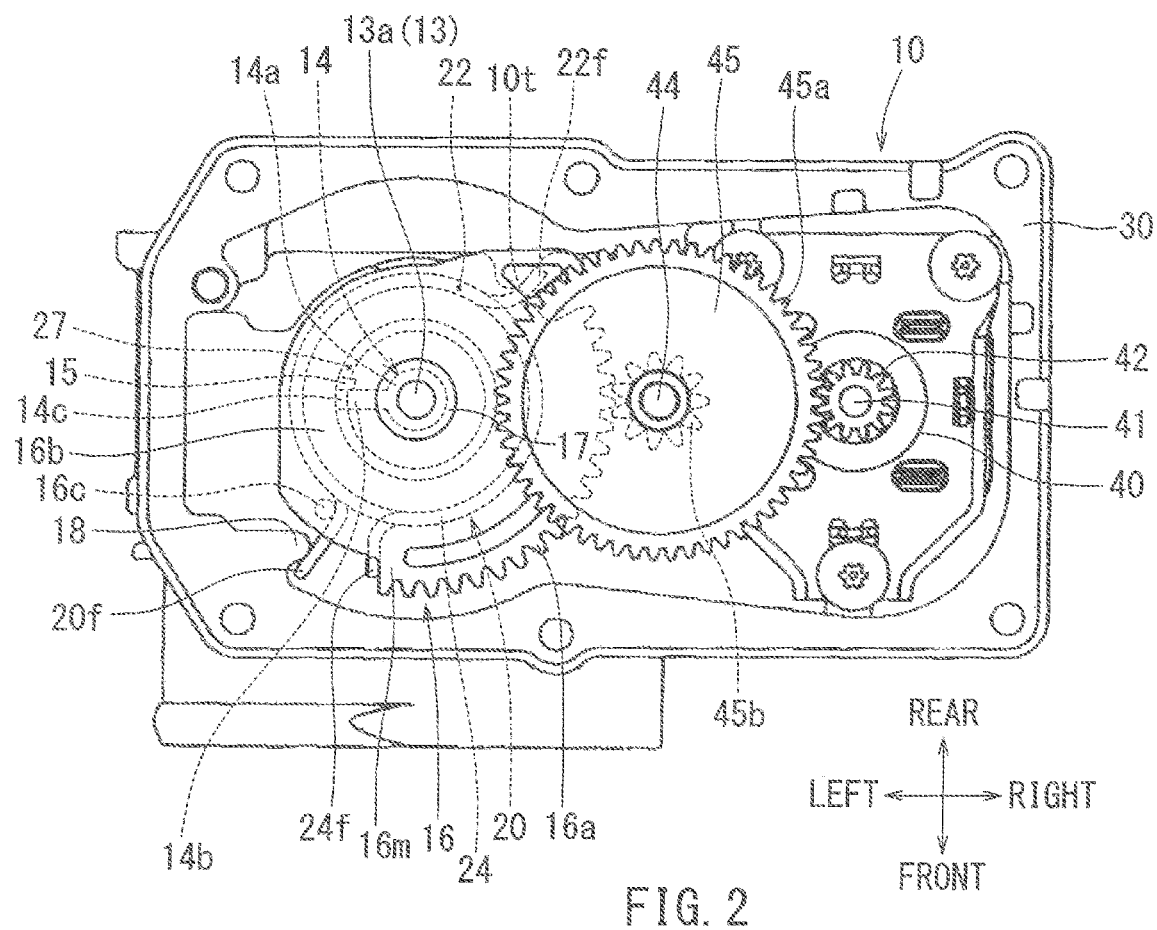
FIG. 2 is a plan view of the throttle device with a gear cover removed.

Representative, non-limiting embodiments according to the present disclosure will now be described with reference to the drawings. As shown in FIGS. 1 and 2, a throttle device 1 according to one embodiment is an electronically controlled throttle device 1 that electronically opens and closes a throttle valve 12. For the purpose of explanation, the upward, downward, leftward and rightward directions are determined based on FIG. 1. However, such an interpretation is not intended to restrict arrangement orientations of the throttle device 1.

As shown in FIG. 1, the throttle device 1 includes a throttle body 10, a throttle valve 12, a throttle gear 16, and a back spring 20. The throttle body 10 includes a hollow cylindrical intake passage 11 that extends in a front-rear direction (in a direction into the drawing shown in FIG. 1). The throttle body 10 is arranged in an internal combustion engine, i.e., an engine system. The throttle body 10 is, for example, made of metal, but it may also be made of resin.

Figure 4:
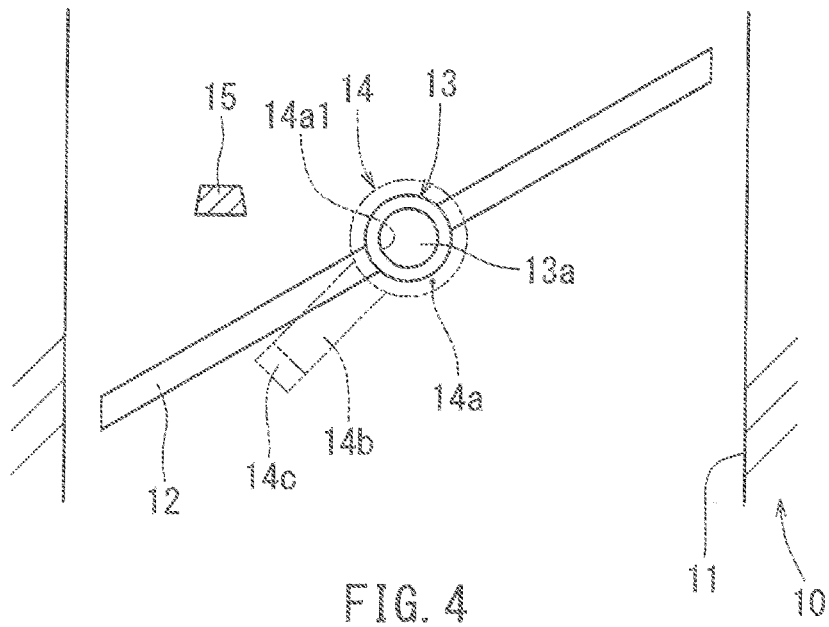
FIG. 4 is a schematic view showing a first step in a manufacturing method.

As shown in FIGS. 1 and 4, the throttle valve 12 is, for example, made of metal and formed in a circular disk. The throttle valve 12 is rotatably supported in the throttle body 10 via a throttle shaft 13. Therefore, the throttle valve 12 can rotate about a longitudinal axis of the throttle shaft 13. The throttle valve 12 is integrally attached to the throttle shaft 13. The throttle shaft 13 is arranged so as to extend across the intake passage 11 in a radial direction (the vertical diametrical direction shown in FIG. 1).

As shown in FIG. 1, the throttle shaft 13 is, for example, made of metal and rotatably supported in throttle body 10 with a pair of upper and lower bearings 25 and 26. The bearings 25 and 26 are respectively arranged at boss portions 27 and 28 formed in the throttle body 10. The bearings 25 and 26 are arranged between the throttle shaft 13 and the boss portions 27 and 28. The throttle valve 12 rotates with the throttle shaft 13 to open and close the intake passage 11. The throttle valve 12 thus controls an amount of intake air flowing through the intake passage 11 to an engine.

As shown in FIG. 1, the throttle body 10 includes a cylindrical gear housing 30 located at an upper portion of the throttle body 10. The cylindrical gear housing 30 has a bottom and an opening that exposes an upper surface of said gear housing. A gear cover 32 is attached to the throttle body 10. The gear cover 32 closes this opening and the upper surface of the gear housing 30. The gear housing 30 houses gears 16, 42 and 45. An upper end of the throttle shaft 13 projects into the gear housing 30.

As shown in FIGS. 1 and 2, the throttle gear 16 is made of resin and attached to the upper end of the throttle shaft 13. A gear portion 16a having a fan-shaped gear is formed around a portion of an outer periphery of the throttle gear 16.

As shown in FIG. 2, the back spring (spring) 20 has a clockwise return spring portion 22 and a counterclockwise initial spring portion 24. The spring portions 22 and 24 are contiguous with each other via a boundary bent portion (stopper member) 20f. The back spring 20 is made of one spring member. The return spring portion 22 is positioned in a lower portion of the back spring 20 while the opener spring portion 24 is positioned in an upper portion of the back spring 20. The return spring portion 22 extends from the boundary bent portion 20f coiling downwardly in a clockwise direction. A leading end 22f of the return spring portion 22 extends radially outward and is engaged with a projection 10t.

As shown in FIG. 2, an initial spring portion (opener spring portion) 24 extends from the leading end 24f coiling downwardly in a counterclockwise direction and continues to the boundary bent portion 20f. The leading end 24f of the initial spring portion 24 extends radially outward and is engaged with a spring retainer 16m of the throttle gear 16. The throttle gear 16 is provided with an initial opening member 16c that extends downwardly from a lower surface of the throttle gear 16. The boundary bent portion 20f is arranged between the initial opening member 16c and the spring retainer 16m. The boundary bent portion 20f is engaged with one end of the initial opening member 16c while the initial spring portion 24 is elastically deformed.

As shown in FIG. 1, a cylindrical motor housing recess 38 having a bottom is formed to a right portion of the throttle body 10. An upper area of the motor housing recess 38 opens upward toward the gear housing 30. A control motor (electric actuator) 40, which is an electric motor such as a DC motor, is housed in the motor housing recess 38. An output shaft 41 of the control motor 40 projects into the gear housing 30. A drive gear 42 is attached to the output shaft 41 projecting into the gear housing 30 (see FIG. 2).

As shown in FIGS. 1 and 2, a counter shaft 44 is positioned between the throttle shaft 13 and the output shaft 41 for the control motor 40 in the gear housing 30. The counter shaft 44 is flush-fitted between the throttle body 10 at the bottom side and the gear cover 32 at the top side. A counter gear 45 is rotatably supported on the counter shaft 44. The counter gear 45 includes a large diameter gear portion 45a and a small diameter gear portion 45b, where both portions are coaxial. The large diameter gear portion 45a meshes with the gear portion 42a of the drive gear 42. The small diameter gear portion 45b meshes with the gear portion 16a of the throttle gear 16.

The control motor 40 is driven and controlled by a control circuit, so-called engine control unit ECU (not shown). The driving force of the control motor 40 is transmitted to the throttle gear 16 via the drive gear 42 and the counter gear 45. As a result, the throttle gear 16 can be rotated in both the opening and closing directions. The throttle shaft 13 and the throttle valve 12 rotate with the throttle gear 16. Consequently, the throttle valve 12 may be opened or closed.

A full-close stopper 15 (see FIGS. 2 and 4) protrudes from an inner periphery of an outer end (upper end) of the upper boss portion 27 of the throttle body 10 shown in FIGS. 1 and 2. As shown in FIG. 1, the small diameter shaft portion 13a protrudes coaxially from an upper end of the throttle shaft 13. The small diameter shaft portion 13a is configured as a columnar shape. The small diameter shaft portion 13a corresponds to an attachment portion for the fully closed opening angle restricting lever 14 and an initial opening angle restricting ring (initial opening angle restricting member, or opener opening angle restricting member) 17.

Figure 3:
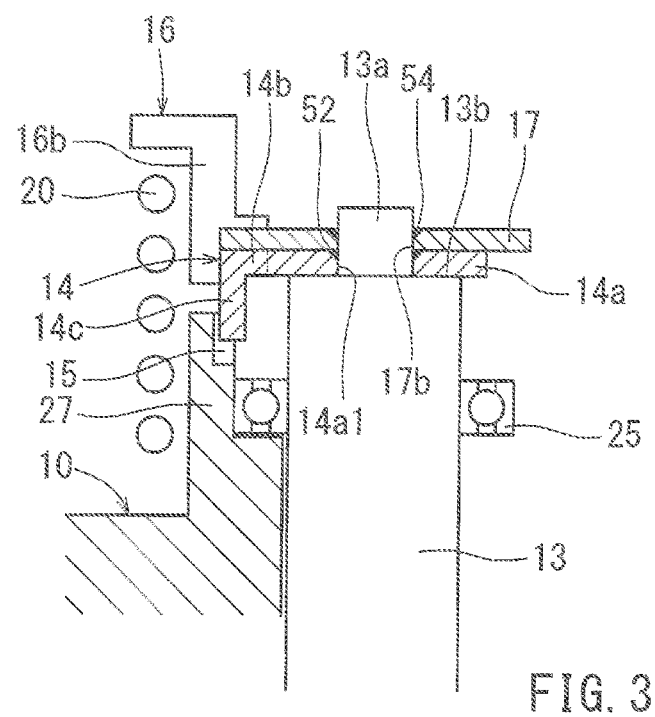
FIG. 3 is a cross-sectional view around a throttle gear.

As shown in FIGS. 2 and 3, the fully closed opening angle restricting lever 14 is attached on the upper end of the throttle shaft 13. The fully closed opening angle restricting lever 14 includes an attachment part 14a made of metal formed as an annular plate, a lever part 14b extending outwardly from the attachment part 14a in a radial direction, and a stopper part 14c extending downwardly from the leading end of the lever part 14b As shown in FIG. 3, the attachment part 14a is fitted to the small diameter shaft portion 13a of the throttle shaft 13 and abuts the end face (stepped face) 13b of the throttle shaft 13. The small diameter shaft portion 13a is fitted into a hole 14a1 within the annular ring of the attachment part 14a. The hole 14a1 is a circular hole and an inner peripheral edge surface (attachment part) of the hole 14a1 contacts the throttle shaft 13 (specifically, the exterior circumference of the small diameter shaft portion 13a). An outer peripheral surface of the small diameter shaft portion 13a and an inner peripheral surface of the attachment part 14a are affixed to each other by welding, e.g., by laser welding (welded part 52). In this way, the fully closed opening angle restricting lever 14 is attached to the throttle shaft 13 in a predetermined angled position.

Figure 5:
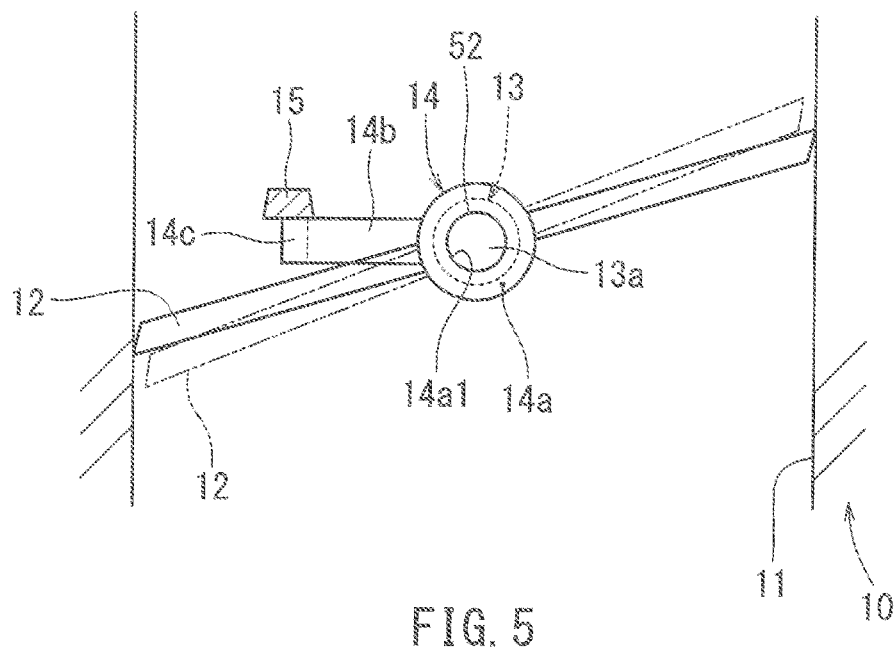
FIG. 5 is a schematic view showing a second step in the manufacturing method.

As shown in FIG. 3, the fully closed opening angle restricting lever (fully closed opening angle restricting member) 14 has the stopper part 14c. The stopper part 14c is rotatably arranged within the upper boss portion 27 of the throttle body 10 with a predetermined gap. As shown in FIG. 5, the stopper part 14c contacts the full-close stopper 15 when the throttle gear 16 rotates in a closing direction. A position where the stopper part 14c contacts full-close stopper 15 corresponds to a fully closed angle (fully closed position) of the throttle gear 16 (including the throttle valve 12 and the throttle shaft 13). Therefore, the throttle gear 16 is restricted from rotating past the fully closed angle.

As shown in FIG. 5, the fully closed angle position is determined such that a slight gap (clearance) is formed at this position between the wall of the intake passage 11 and an outer peripheral edge of the throttle valve 12. In the fully closed angle position, the outer peripheral edge of the throttle valve 12 does not contact the wall of the intake passage 11. If in the fully closed angle position the outer peripheral edge of the throttle valve 12 did contact the wall of the intake passage 11, then the outer peripheral edge of the throttle valve 12 and the wall of the intake passage 11 would contact each other resulting in substantial friction, whereby the intake passage 11 and/or the throttle valve 12 would be damaged.

As shown in FIG. 2, the throttle body 10 includes a protruding initial-open stopper (opener stopper) 18. As shown in FIGS. 2 and 3, the throttle gear 16 is provided with a cylindrical boss portion 16b on a lower surface thereof. The boss portion 16b is coaxial with the throttle shaft 13, about the vertical axis at the center of 13a in the up-down direction. The initial opening angle restricting ring 17 is formed as an annular plate. A portion of the circumferential outer edge of the ring 17 is embedded in the boss portion 16b of the throttle gear 16. The initial opening angle restricting ring 17 is attached to the throttle gear 16 in a fixed non-rotatable manner and rotates in a synchronous manner along with the throttle gear 16. In contrast, the initial opening angle restricting ring 17 is a separate member from and does not rotate synchronously with the fully closed opening angle restricting lever 14.

As shown in FIG. 3, the initial opening angle restricting ring (initial opening angle restricting member, or opener opening angle restricting member) 17 is fitted around the peripheral circumferential surface of the small diameter shaft portion 13a of the throttle shaft 13 and placed on the attachment part 14a of the fully closed opening angle restricting lever 14. In particular, the outer peripheral circumferential surface of the small diameter portion 13a is fitted into a hole 17b of the initial opening angle restricting ring 17. The hole 17b is a circular hole and an inner circumferential peripheral surface (attachment part) of the hole 17b is attached to the throttle shaft 13 (specifically, small diameter shaft portion 13a). The outer peripheral circumferential surface of the small diameter shaft portion 13a and the inner peripheral circumferential surface of hole 17b of the initial opening angle restricting ring 17 are fixed by welding, e.g., by laser welding (welded part 52). In this way, the throttle gear 16 is attached to the throttle shaft 13 in a predetermined angled position.

The boundary bent portion 20f of the back spring 20 may abut the initial-open stopper (opener stopper) 18 when the throttle gear 16 rotates clockwise in a closing direction. The initial opening angle of the throttle gear 16 (including the throttle valve 12 and the throttle shaft 13) is defined as a position where the boundary bent portion 20f abuts the initial-open stopper 18. More specifically, the initial opening angle is a position where the biasing force of the return spring portion 22 of the back spring 20 in a closing direction and the biasing force of the initial spring portion 24 in an opening direction are balanced. At the initial opening angle, throttle valve 12 (see FIG. 1) opens wider from the fully closed angle position by a predetermined amount.

Figure 21:
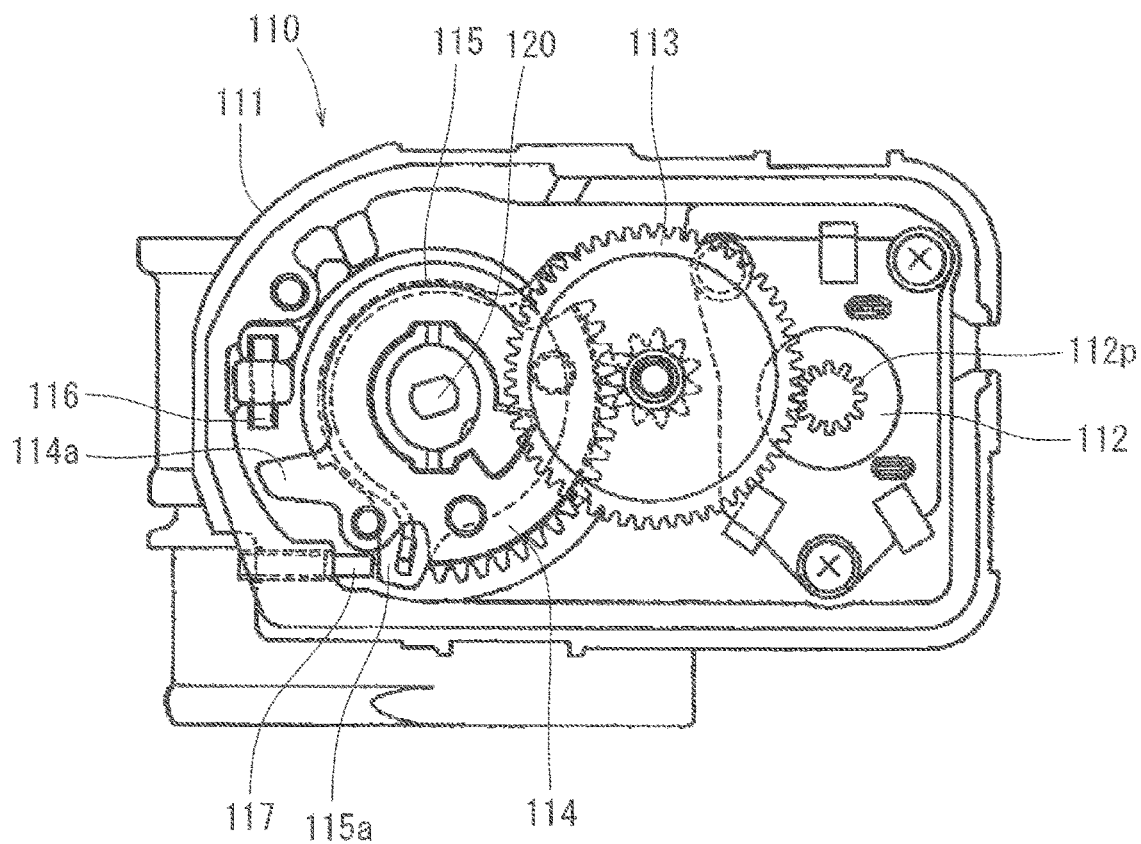
FIG. 21 is a cross-sectional view of a throttle device according to a conventional example.

According to the above-mentioned embodiment of throttle device 1, the fully closed opening restricting screw 116 and the initial opening angle restricting screw 117, both of which have been conventionally considered as necessary in prior devices as shown in FIG. 21, can be eliminated. Therefore, the number of components and the cost as well as maintenance can be reduced while maintaining accuracy of the fully closed angle and the initial opening angle. The full-close stopper 15 shown in FIG. 3 and the initial-open stopper 18 shown in FIG. 2 may also be formed as part of the throttle body 10. Therefore, the full-close stopper 15 and the initial-open stopper 18 may remain in one position with respect to the throttle body 10, unlike with the throttle body and the fully closed opening angle restricting screw 116 and the initial opening angle restricting screw 117 shown in FIG. 21 of the prior art. Accordingly, an increased degree of accuracy in the fully closed angle of the throttle device 1 and the initial opening angle can be ensured.

Exemplary methods for manufacturing the throttle device 1, and more particularly, for attaching the fully closed opening angle restricting lever 14 and the throttle gear 16 to the throttle shaft 13, will now be described Referring to FIGS. 1 and 4, the throttle valve 12 is attached to the throttle shaft 13 and the throttle shaft 13 is assembled to the throttle body 10. The attachment part 14a of the fully closed opening angle restricting lever 14 is rotatably attached to the small diameter shaft portion 13a of the throttle shaft 13.

As shown in FIG. 5, the stopper part 14c of the fully closed opening angle restricting lever 14 abuts the full-close stopper 15. As indicated by the solid line around throttle valve 12 in FIG. 5, the throttle valve 12 touches, i.e., with metal on its outer periphery, the inner wall surface of the intake passage 11. Subsequently, the throttle valve 12 is opened to the necessary extent of opening, i.e., at the fully-closed opening angle (for example, 0.7°) as shown by the dotted line in FIG. 5, while the stopper part 14c of the fully closed opening angle restricting lever 14 abuts to the full-close stopper 15. In this way, the aforementioned gap or clearance between the wall of the intake passage 11 and the outer peripheral edge of the throttle valve 12 is ensured at the fully closed angle. In this position, the small diameter shaft portion 13a of the throttle shaft 13 and the attachment part 14a of the fully closed opening angle restricting lever 14 are fixed by laser welding (welded part 52) as shown in FIG. 3. Thus, the fully closed opening angle restricting lever 14 is attached to the throttle shaft 13 at a predetermined radial position relative to the throttle shaft 13.

Figure 6:
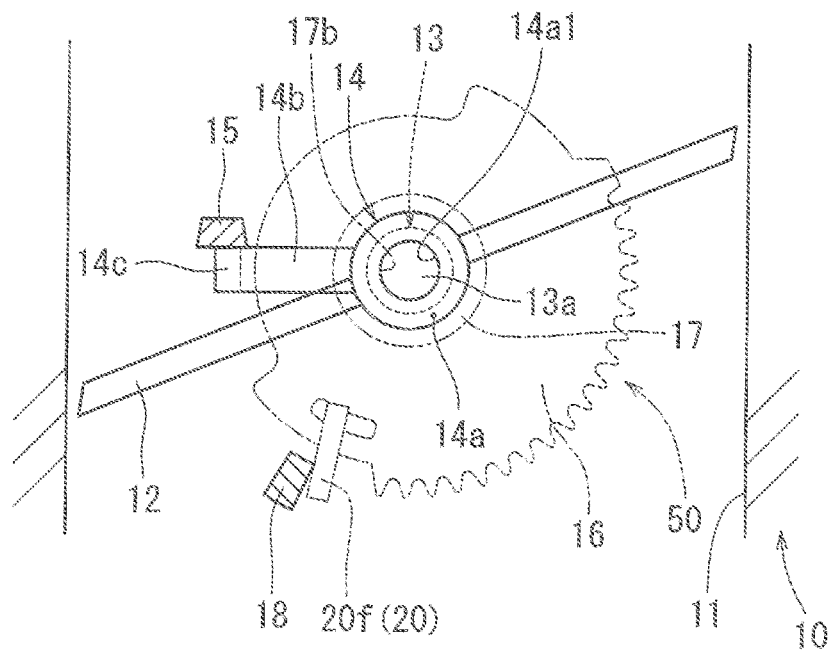
FIG. 6 is a schematic view showing a third step in the manufacturing method.

Further, the initial opening angle restricting ring 17 of the throttle gear 16 is rotatably attached to the small diameter shaft portion 13a of the throttle shaft 13 as shown in FIG. 6. Referring to FIG. 2, the leading end 24f at the initial spring portion 24 of the back spring 20 engages with a spring retainer 16m of the throttle gear 16. The bent portion 20f engages with the opener member 16c while the opener spring portion 24 is elastically deformed. In this way, through said engagement, the back spring 20 is assembled to the throttle gear 16 (assembly 50).

Referring to FIG. 2, the leading end 22f at the return spring portion 22 of the back spring 20 engages with a protrusion 10t of the throttle body 10. The boundary bent portion 20f of the back spring 20 abuts the initial-open stopper 18 of the throttle body 10 when the return spring portion 22 is elastically deformed. The initial opening angle is defined as a state where the boundary bent portion 20f abuts the initial-open stopper 18 while external force is not being applied to the throttle gear 16.

Figure 7:
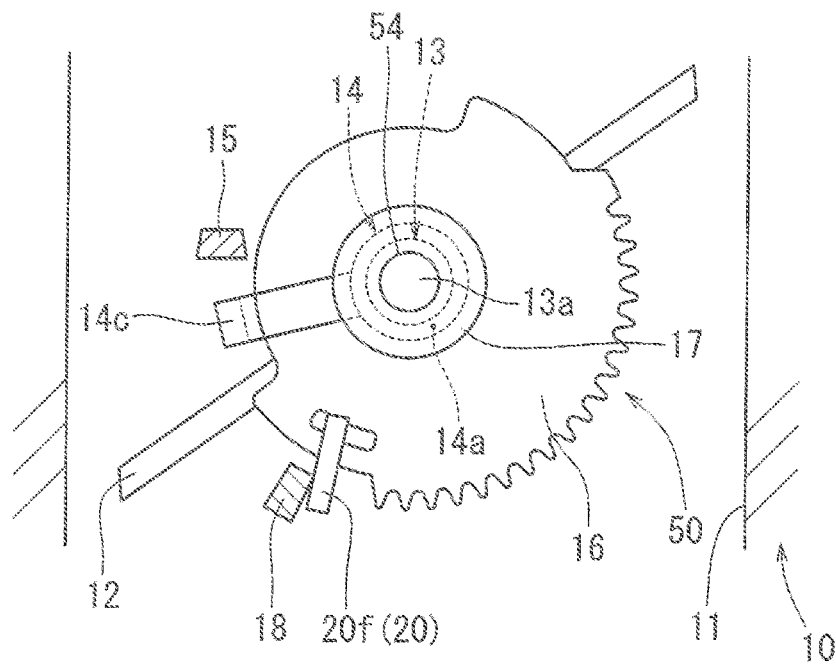
FIG. 7 is a schematic view showing a fourth step in the manufacturing method.

As shown in FIG. 7, at the initial opening angle, the throttle valve 12 is opened (for example, a position angled at 8° radially further away from the wall than the fully closed angle) while the throttle gear 16 is positioned at an initial opening angle. In this state, the small diameter shaft portion 13a of the throttle shaft 13 and the initial opening angle restricting ring 17 are fixed by laser welding (welded part 54) as shown in FIG. 3. At this time, the initial opening angle restricting ring 17 may be fixed to both the attachment part 14a of the fully closed opening angle restricting lever 14 as well as small diameter shaft portion 13a of the throttle shaft 13 or only to the attachment part 14a of the fully closed opening angle restricting lever 14 by laser welding. In this way, the initial opening angle restricting ring 17 and the throttle gear 16 are radially fixed relative to the throttle shaft 13 in a predetermined position. Thus, the throttle gear 16 is positioned at an initial opening angle such that the throttle valve 12 is opened at said angle while external force is not applied to the throttle gear 16.

As described-above, the fully closed opening angle restricting lever 14 is fixed to the throttle shaft 13 (first step) and subsequently the initial opening angle restricting ring 17 of the throttle gear 16 is fixed to the throttle shaft 13 (second step).

Figure 8:
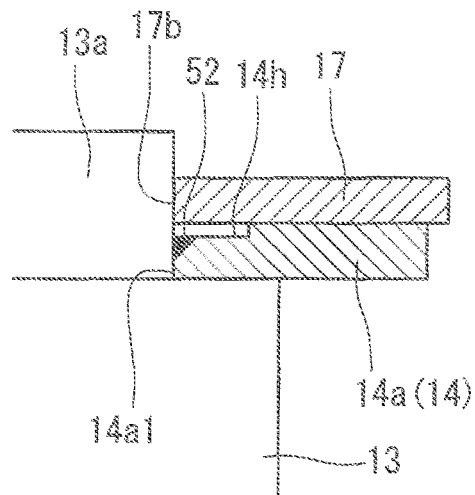
FIG. 8 is a partial cross-sectional view according to another embodiment.
Figure 9:
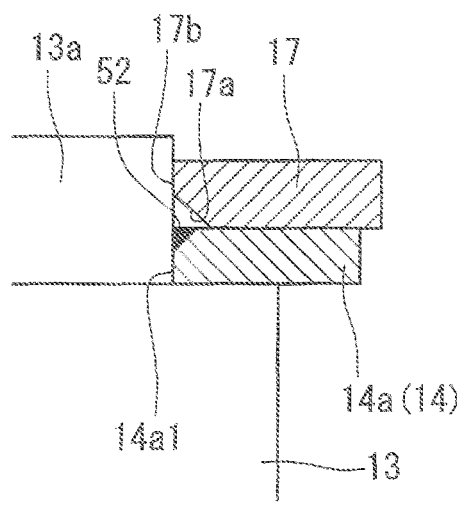
FIG. 9 is a partial cross-sectional view according to another embodiment.

Referring to FIG. 3, a part of the welded part (welded part 52) may bulge out from the attachment part 14a when the attachment part 14a of the fully closed opening angle restricting lever 14 is welded to the small diameter shaft portion 13a of the throttle shaft 13. The initial opening angle restricting ring 17 of the throttle gear 16, which is placed on the attachment part 14a, may then due to said bulge be inclined with respect to the attachment part 14a or a gap may be formed due to said bulge part being formed. This in turn may cause a deficiency such as where the initial opening angle restricting ring 17 may not able to be attached accurately to the throttle shaft 13 in a particular position. In order to avoid such a deficiency, as shown in FIG. 8, the fully closed opening angle restricting lever 14 preferably includes a step (groove 14h) along an edge of the hole 14a1 on an upper surface of the attachment part 14a. Additionally or alternatively, as shown in FIG. 9, the initial opening angle restricting ring 17 may include a chamfered part 17a along the edge of the hole 17b on a lower surface.

The control motor (electric actuator) 40 shown in FIGS. 1 and 2 is controlled by an engine control unit (ECU) to rotate the drive gear 42 with the output shaft 41. The drive gear 42 rotates the throttle shaft 13 via the counter gear 45 and the throttle gear 16. Referring to FIG. 7, the throttle valve 12 rotates with the throttle shaft 13 around the longitudinal axis of the throttle shaft 13, whereby the intake passage 11 is opened or closed by said rotation.

Referring to FIGS. 2 and 7, the opener member 16c moves with the throttle gear 16 when the throttle valve 12 rotates from the initial opening angle in an opening direction (counterclockwise, in a radial direction away from the wall of intake passage 11). As a result, the return spring portion 22 is elastically deformed so that the throttle valve 12 is rotated against the elastic force of the return spring portion 22. At this moment, the boundary bent portion (stopper member) 20f moves away from the initial-open stopper 18. Conversely, when the throttle valve 12 rotates from the initial opening angle in a closing direction (clockwise, in a radial direction towards the wall of intake passage 22), the initial spring portion 24 is elastically deformed and throttle valve 12 rotates against the elastic force of the initial spring portion 24 while the boundary bent portion 20f abuts the initial-open stopper 18. The stopper part 14c abuts the full-close stopper 15 such that the rotating motion of the throttle valve 12 stops at a fully closed angle.

Figure 10:
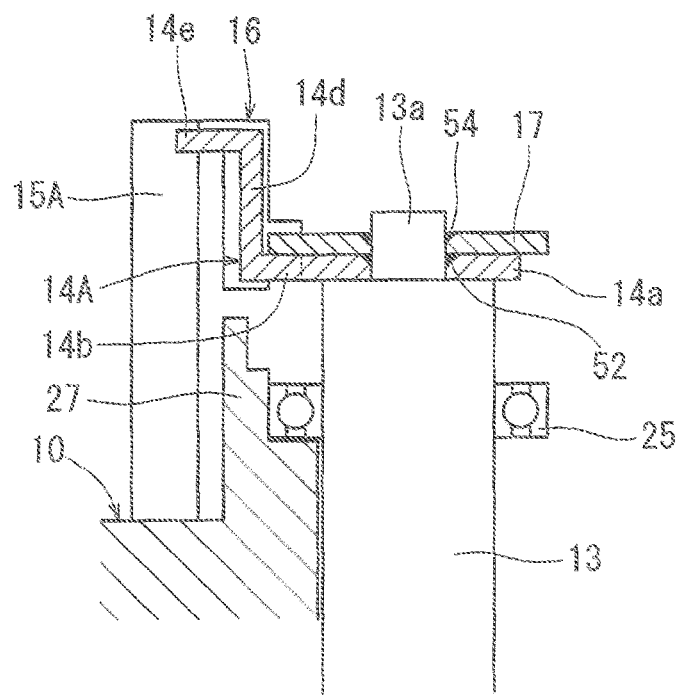
FIG. 10 is a cross-sectional view around a throttle gear according to another embodiment.

As an alternative to the full-close stopper 15 and the fully closed opening angle restricting lever 14 shown in FIG. 3, the throttle device 1 may have a full-close stopper 15A and a fully closed opening angle restricting lever 14A shown in FIG. 10. As shown in FIG. 10, the full-close stopper 15A has a columnar shape and is formed on the throttle body 10 and positioned, for example, to the radial exterior of the upper boss portion 27.

As shown in FIG. 10, the fully closed opening angle restricting lever 14A has an attachment part 14a and a lever part 14b similar to the fully closed opening angle restricting lever 14 shown in FIG. 3. The fully closed opening angle restricting lever 14A has an arm part 14d and a stopper part 14e as an alternative to the stopper part 14c shown in FIG. 3. The arm part 14d extends upwardly from an outer peripheral end of the lever part 14b. The stopper part 14e extends radially outward from a leading end (upper end) of the arm part 14d. The stopper part 14e abuts an upper end of the full-close stopper 15A when the throttle gear 16 rotates in a closing direction.

Figure 11:
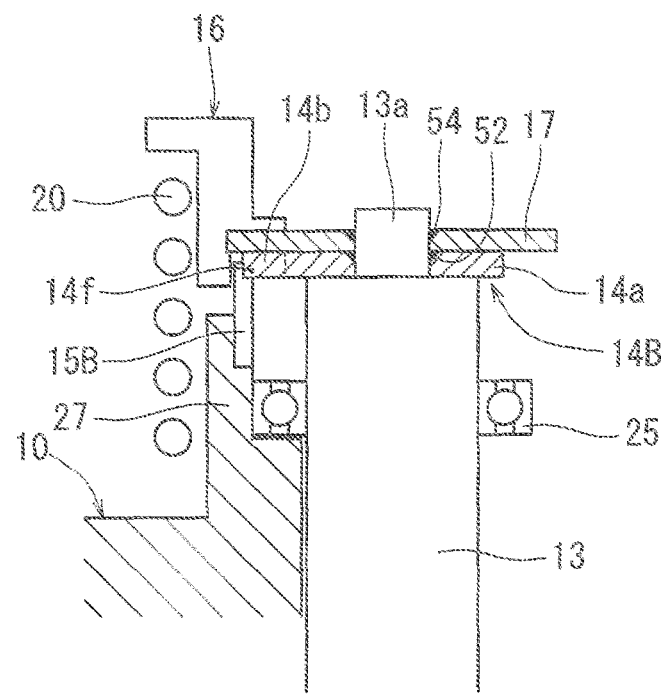
FIG. 11 is a cross-sectional view around a throttle gear according to another embodiment.

As shown in FIG. 11, the throttle device 1 may include a fully closed opening angle restricting lever 14B and a full-close stopper 15B as an alternative to the fully closed opening angle restricting lever 14 and the full-close stopper 15 shown in FIG. 3. As shown in FIG. 11, the fully closed opening angle restricting lever 14B includes an attachment part 14a and the lever part 14b similar to the fully closed opening angle restricting lever 14 shown in FIG. 3. Alternative to the stopper part 14c shown in FIG. 3, the fully closed opening angle restricting lever 14B has a stopper part 14f formed as a horizontal extension leading end of the lever part 14b. The full-close stopper 15B is formed as a columnar shape on the throttle body 10 and extends, for example, upwards from the upper boss portion 27. The stopper part 14f abuts an upper part of the full-close stopper 15B when the throttle gear 16 rotates in a closing direction, and the fully closed opening angle restricting lever 14B contacts the full-close stopper 15B.

Figure 12:
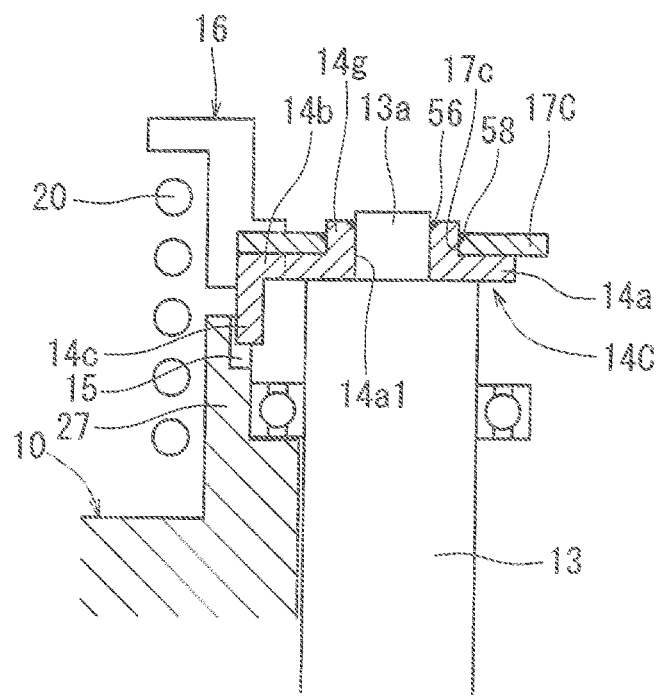
FIG. 12 is a cross-sectional view around a throttle gear according to another embodiment.
Figure 13:
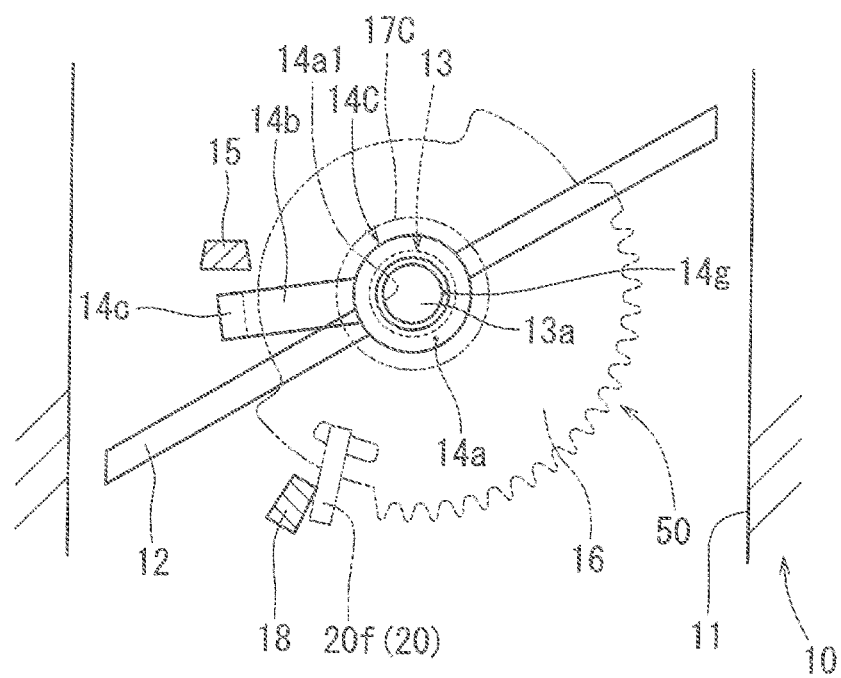
FIG. 13 is a schematic view showing a first step in a manufacturing method.

As shown in FIGS. 12 to 15, the throttle device 1 may include a fully closed opening angle restricting lever 14C and an initial opening angle restricting ring (initial opening angle restricting member, or opener opening angle restricting member) 17C as an alternative to the fully closed opening angle restricting lever 14 and the initial opening angle restricting ring 17 shown in FIGS. 3 to 7. As shown in FIG. 12, the fully closed opening angle restricting lever 14C has the attachment part 14a, lever part 14b and the stopper part 14c similar to the fully closed opening angle restricting lever 14 shown in FIG. 3. The fully closed opening angle restricting lever 14C, however, also has a tubular portion 14g located at the inner radial periphery of the attachment part 14a. The tubular portion 14g can be fitted around the small diameter shaft portion 13a of the throttle shaft 13. The vertical axial length of the hole 14a1 is increased due to the presence of the tubular portion 14g. An outer peripheral surface of the small diameter shaft portion 13a and the corresponding inner peripheral surface of the upper end of the tubular portion 14g may be fixed by welding, for example, laser welding (welded part 56).

As shown in FIG. 12, the annular shape of the initial opening angle restricting ring 17C includes a central circular hole 17c in which the tubular portion 14g of the fully closed opening angle restricting lever 14C is fitted. An inner peripheral surface of the initial opening angle restricting ring 17C and a corresponding outer peripheral surface of the tubular portion 14g are fixed by welding, for example, laser welding (welded part 58). The embodiment shown in FIG. 12 may obtain similar effect to that of the embodiment shown in FIG. 3.

In order to manufacture the configuration shown in FIG. 12, the tubular portion 14g of the fully closed opening angle restricting lever 14C is rotatably fitted around the small diameter shaft portion 13a of the throttle shaft 13 that is attached to the throttle body 10, before the lever 14C is affixed to the throttle shaft 13. Subsequently, after the fitting of the fully closed opening angle restricting lever 14C, the initial opening angle restricting ring 17 of the throttle gear 16 is rotatably fitted to the tubular portion 14g.

Figure 14:
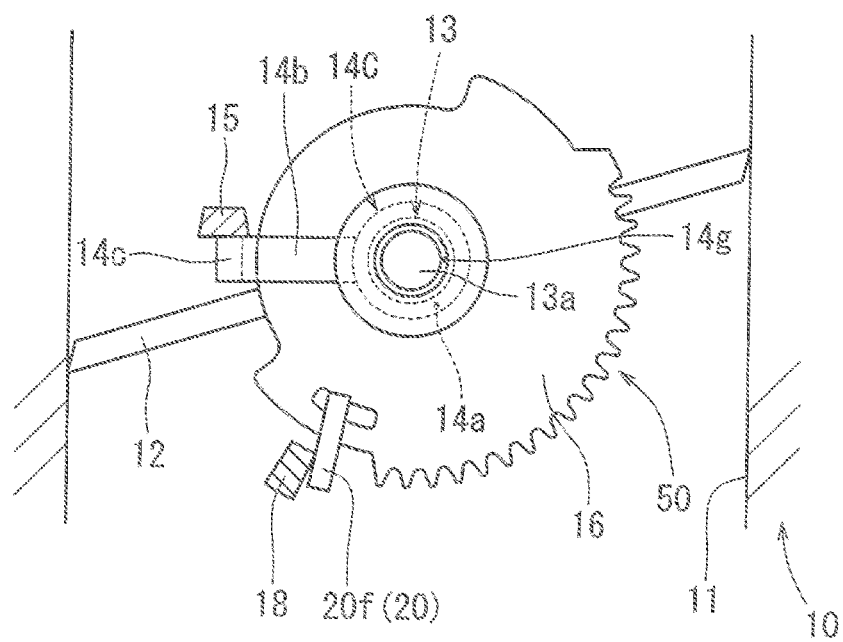
FIG. 14 is a schematic view showing a second step in the manufacturing method.

As shown in FIG. 14, the stopper part 14c of the fully closed opening angle restricting lever 14C abuts the full-close stopper 15. The throttle valve 12 touches, via metal contact, the inner wall surface of the intake passage 11.

Figure 15:
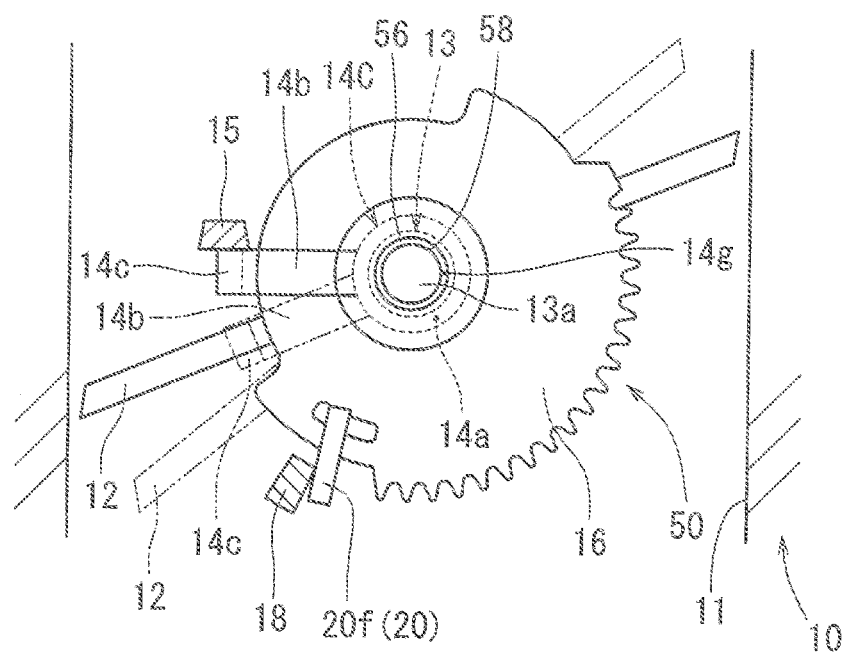
FIG. 15 is a schematic view showing a third step in the manufacturing method.

As indicated by the dotted lines with two dashes in FIG. 15, the throttle valve 12 is rotated to a predetermined angle, for example, of 8.7°. The predetermined angle represents a sum of the fully-closed opening position (where at this position the throttle valve is open for example, to 0.7° to prevent damage to the intake passage and throttle valve as described above) and an initial opening degree (for example, of 8°). The fully closed opening angle restricting lever 14C is rotated from a position where it abuts the full-close stopper 15, corresponding to the fully-closed opening position, by an initial opening degree (for example, 8°, where when it abuts the full-close stopper 15, the throttle valve is already open 0.7° as described). During rotating the throttle valve 12 as described above, the throttle gear 16 is maintained at an initial opening angle due to spring force of the back spring 20.

In this state shown in FIG. 15, the small diameter shaft portion 13a and the tubular portion 14g of the fully closed opening angle restricting lever 14C are fixed to each other by laser welding (welded part 56) as shown in FIG. 12. The tubular portion 14g of the fully closed opening angle restricting lever 14C and the initial opening angle restricting ring 17C are fixed to each other by laser welding (welded part 58).

As shown in FIG. 12, the initial opening angle restricting ring 17C is fixed to the tubular portion 14g of the fully closed opening angle restricting lever 14C, which in turn is fixed to the throttle shaft 13. In other words, the initial opening angle restricting ring 17C is fixed to a part of the throttle shaft 13 because the fully closed opening angle restricting lever 14C through its prior affixing already constitutes a part of the throttle shaft 13.

In the above manufacturing method, a position where the fully closed opening angle restricting lever 14C is to be fixed to the throttle shaft 13 is determined before a position where the initial opening angle restricting ring 17C is to be fixed to the throttle shaft 13 is determined. However, it is also possible to determine a position where the initial opening angle restricting ring 17C is to be fixed to the throttle shaft 13 before a position where the fully closed opening angle restricting lever 14C is to be fixed to the throttle shaft 13.

Figure 16:
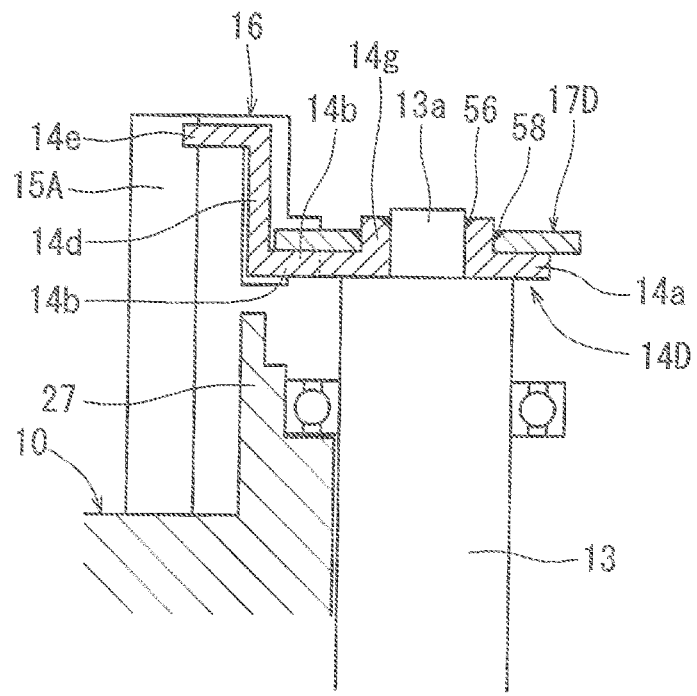
FIG. 16 is a cross-sectional view around a throttle gear according to another embodiment.

Alternative to the fully closed opening angle restricting lever 14A and the initial opening angle restricting ring 17 shown in FIG. 10, the throttle device 1 may have the fully closed opening angle restricting lever 14D and the initial opening angle restricting ring (initial opening angle restricting member, or opener opening angle restricting member) 17D shown in FIG. 16. As shown in FIG. 16, the fully closed opening angle restricting lever 14D includes an attachment part 14a, a lever part 14b, an arm part 14d and a stopper part 14e similar to the fully closed opening angle restricting lever 14A shown in FIG. 10. However, as shown in FIG. 16, the fully closed opening angle restricting lever 14D also includes a tubular portion 14g at the inner radial periphery of the attachment part 14a similar to the fully closed opening angle restricting lever 14C shown in FIG. 12. The tubular portion 14g is fitted around the small diameter shaft portion 13a of the throttle shaft 13 and fixed to the small diameter shaft portion 13a by welding (welded part 56). The initial opening angle restricting ring 17D is fitted around the tubular portion 14g of the fully closed opening angle restricting lever 14D and fixed by welding (welded part 58) similar to the embodiment shown in FIG. 12.

In the embodiment shown in FIG. 16, the determination of the fixing position of the fully closed opening angle restricting lever 14D to the throttle shaft 13 may be made prior to the determination of the fixing position of the initial opening angle restricting ring 17D to the throttle shaft 13, or vice versa.

Figure 17:
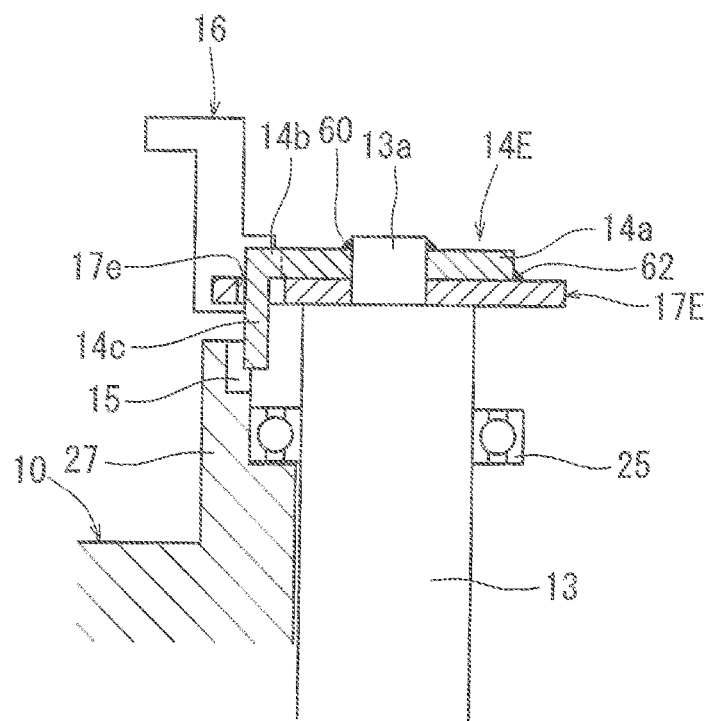
FIG. 17 is a cross-sectional view around a throttle gear according to another embodiment.

As shown in FIG. 17, the throttle device 1 may include a fully closed opening angle restricting lever 14E and an initial opening angle restricting ring (initial opening angle restricting member, or opener opening angle restricting member) 17E as an alternative to the fully closed opening angle restricting lever 14 and the initial opening angle restricting ring 17 shown in FIG. 3. In the embodiment shown in FIG. 17, the fully closed opening angle restricting lever 14E and the throttle gear 16 (including the initial opening angle restricting ring 17E) may be fitted with respect to the small diameter shaft portion 13a of the throttle shaft 13 in reverse order to that of the embodiment shown in FIG. 3. Similar to the fully closed opening angle restricting lever 14 shown in FIG. 3, the fully closed opening angle restricting lever 14E includes the attachment part 14a, lever part 14b and the stopper part 14c.

Figure 18:
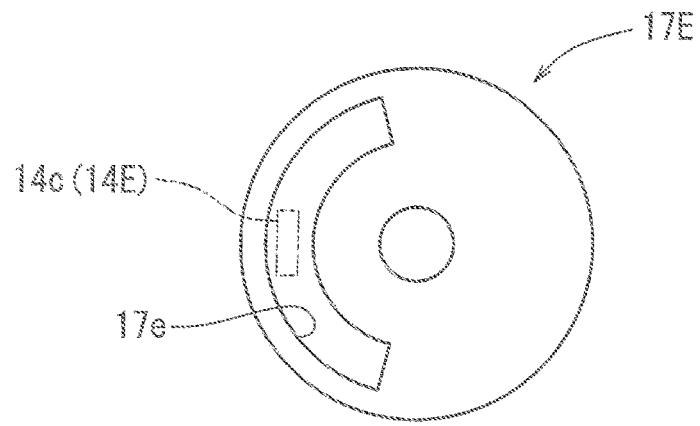
FIG. 18 is a plan view of an initial opening angle restricting ring.

As shown in FIGS. 17 and 18, in this embodiment, an opening hole 17e is formed in the initial opening angle restricting ring 17E through which the stopper part 14c of the fully closed opening angle restricting lever 14E is inserted. The opening hole 17e is formed in a circular arc shape that rotates about the center of opening angle restricting ring 17E. Therefore, the fully closed opening angle restricting lever 14E is allowed to rotate relative to the initial opening angle restricting ring 17E before the fully closed opening angle restricting lever 14E and the initial opening angle restricting ring 17E are fixed relative to each other. After the initial opening angle restricting ring 17E is fitted around the small diameter shaft portion 13a of the throttle shaft 13, the attachment part 14a of the fully closed opening angle restricting lever 14E is fitted around the small diameter shaft portion 13a of the throttle shaft 13.

As shown in FIG. 17, the attachment part 14a of the fully closed opening angle restricting lever 14E is fitted around the diameter shaft portion 13a of the throttle shaft 13. The outer radial peripheral surface of the small diameter shaft portion 13a of the throttle shaft 13 and the corresponding upper inner radial peripheral surface of the attachment part 14a of the fully closed opening angle restricting lever 14E are fixed by welding (welded part 60). The outer peripheral surface of the attachment part 14a of the fully closed opening angle restricting lever 14E and the corresponding upper surface of the initial opening angle restricting ring 17E are fixed by welding (welded part 62).

Also, in the embodiment shown in FIG. 17, in terms of position, either the determination of a position for fixing the fully closed opening angle restricting lever 14E with respect to the throttle shaft 13 or the determination of a position for fixing the initial opening angle restricting ring 17E with respect to the throttle shaft 13 may be made prior to the other one. In terms of order of fixing, the initial opening angle restricting ring 17E is fixed to the fully closed opening angle restricting lever 14E. In other words, the initial opening angle restricting ring 17E may be considered to be fixed to a part of the throttle shaft 13 because the fully closed opening angle restricting lever 14E may be fixed to the throttle shaft 13 to then constitute a part of the throttle shaft 13 before the initial opening angle restricting ring 17E is fixed to the fully closed opening angle restricting lever 14E.

Figure 19:
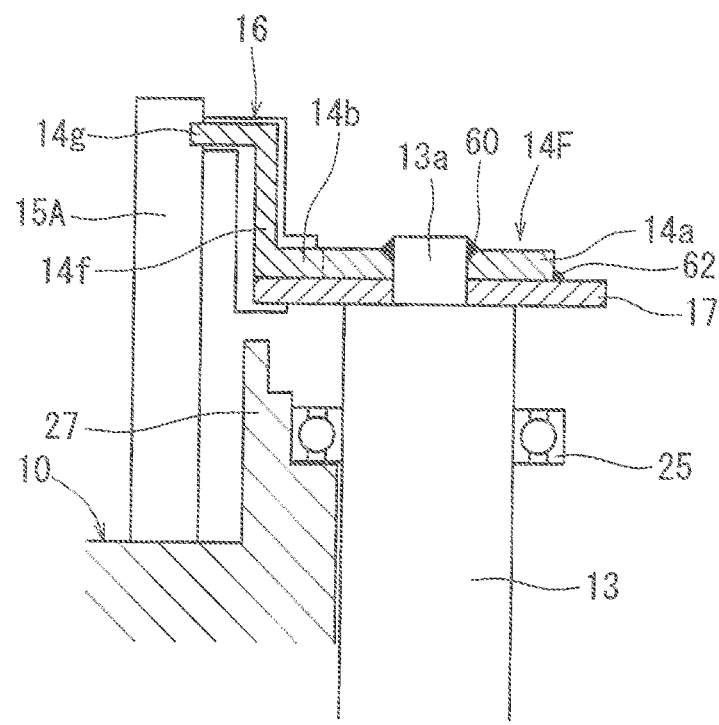
FIG. 19 is a cross-sectional view around a throttle gear according to another embodiment.

As shown in FIG. 19, the throttle device 1 may also include a fully closed opening angle restricting lever 14F, the initial opening angle restricting ring 17 and the full-close stopper 15A as an alternative to the fully closed opening angle restricting lever 14E, the initial opening angle restricting ring 17E shown in FIG. 17 and the full-close stopper 15 shown in FIG. 10. The initial opening angle restricting ring 17 and the full-close stopper 15A shown in FIG. 19 are configured in a similar manner to the configuration of the initial opening angle restricting ring 17 and the full-close stopper 15A shown in FIG. 10.

The fully closed opening angle restricting lever 14F shown in FIG. 19 includes the attachment part 14a and the lever part 14b similar to the fully closed opening angle restricting lever 14A shown in FIG. 10. The fully closed opening angle restricting lever 14F includes an arm part 14f extending upwardly from an outer peripheral edge of the lever part 14b and a stopper part 14g extending radially horizontally outward from the leading end (upper end) of the arm part 14f.

In the embodiment shown in FIG. 19, the attachment part 14a of the fully closed opening angle restricting lever 14F is fitted around the small diameter shaft portion 13a after the initial opening angle restricting ring 17 is fitted to the small diameter shaft portion 13a of the throttle shaft 1, resulting in a configuration similar in appearance to the embodiment shown in FIG. 17. The outer peripheral surface of the small diameter shaft portion 13a of the throttle shaft 13 and the corresponding upper inner peripheral surface of the attachment part 14a of the fully closed opening angle restricting lever 14F are fixed to each other by welding (welded part 60). Similarly the outer peripheral surface of the attachment part 14a of the fully closed opening angle restricting lever 14F and the corresponding upper surface of the initial opening restricting ring 17 are fixed to each other by welding (welded part 62).

Figure 20:
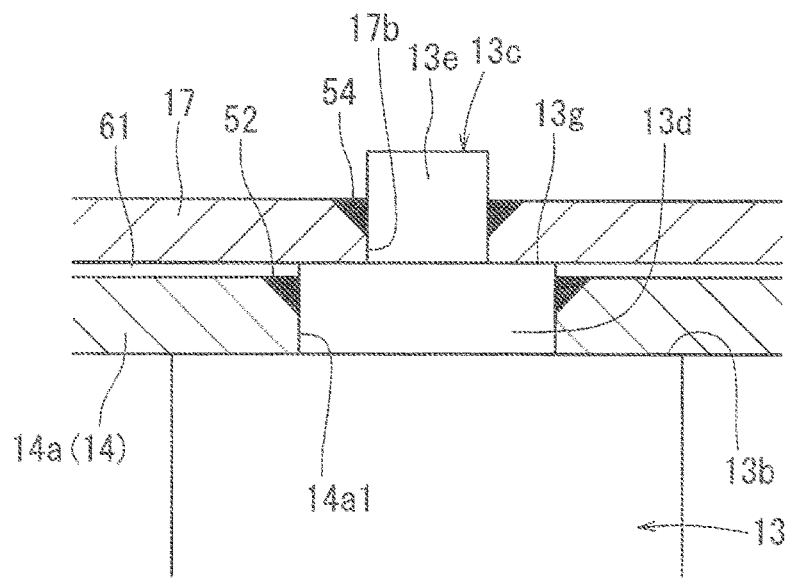
FIG. 20 is a cross-sectional view around a throttle gear according to another embodiment.

As shown in FIG. 20, the throttle shaft 13 may include a stepped shaft portion 13c on an upper end as an alternative to the small diameter shaft portion 13a shown in FIG. 3. As shown in FIG. 20, the stepped shaft portion 13c has an intermediate diameter shaft portion 13d and the small diameter shaft portion 13e. An upper end face 13g of the intermediate diameter shaft portion 13d extends orthogonally to the vertical longitudinal axis of the throttle shaft 13. The vertical axial length of the intermediate diameter shaft portion 13d is longer than a thickness of the attachment part 14a of the fully closed opening angle restricting lever 14. Planes of end faces 13b and 13g are respectively formed by cutting. The intermediate diameter shaft portion 13d and the small diameter shaft portion 13e are respectively formed as cylindrical circular shaft shapes. The intermediate diameter shaft portion 13d of the stepped shaft portion 13c corresponds to the attachment part of the fully closed opening angle restricting lever 14 and the small diameter shaft portion 13e corresponds to the attachment part of the initial opening angle restricting ring 17.

The attachment part 14a is fitted around the intermediate diameter shaft portion 13d of the throttle shaft 13 and abuts the upper end face 13b. The initial opening angle restricting ring 17 is fitted around the small diameter shaft portion 13e of the throttle shaft 13 and abuts the end face 13g. Since the axial length of the intermediate diameter shaft portion 13d is longer than the thickness of the attachment part 14a, a vertical clearance 61 is formed between the attachment part 14a and the initial opening angle restricting ring 17. This clearance 61 prevents the initial opening angle restricting ring 17 from being inclined or displaced relative to the fully closed opening angle restricting lever 14 due to bulging of the welded part 52. In this way, the initial opening angle restricting ring 17 can be affixed to the throttle shaft 13 at a precise position in an accurate manner. This configuration can also be applied to the exemplary embodiments in FIGS. 10 and 11.

The various exemplary embodiments described above in detail with reference to the attached drawings are intended to be representative of this disclosure and are thus non limiting embodiments. The detailed description is intended to teach a person of skill in the art to make, use and/or practice various aspects of the present teachings and thus does not limit the scope of any invention in any manner. Furthermore, each of the additional features and teachings disclosed above may be applied and/or used separately or with other features and teachings in any combination thereof, to provide improved throttle device and/or methods of making and using the same.

What is claimed is:

1. A throttle device comprising:
    a throttle body with an intake passage;
    a throttle valve disposed in the intake passage for opening and closing the intake passage;
    a throttle shaft rotatably arranged on the throttle body such that it is integrally formed with and rotates simultaneously with the throttle valve;
    a throttle gear affixed to the throttle shaft via an initial opening angle restricting member and rotatably driven by an electric actuator, wherein the throttle gear rotates in opening and closing directions;
    a spring that biases the throttle gear to a predetermined initial opening angle;
    a full-close stopper provided on the throttle body to restrict the throttle gear from rotating past a fully closed angle;
    an initial-open stopper provided on the throttle body to restrict a stopper member of the spring from rotating past an initial opening angle of the stopper member; and
    a fully closed opening angle restricting member fixedly attached to the throttle shaft in a position where the fully closed opening angle restricting member can abut the full-close stopper;
    wherein the initial opening angle restricting member fixes the throttle gear on the throttle shaft in a position where the stopper member abuts the initial-open stopper,
    the throttle shaft includes an attachment part having a circular shaft shape to which the fully closed opening angle restricting member and the initial opening angle restricting member are attached the fully closed opening angle restricting member is fixed at a predetermined angle independently of the initial opening angle restricting member and each of the fully closed opening angle restricting member and the initial opening angle restricting member have a fixed portion having a hole configured such that the attachment part of the throttle shaft is inserted into the hole in a rotatable manner before being fixed to the attachment part.

2. A method for manufacturing a throttle device comprising the steps of:
- rotatably mounting a throttle shaft, to which a throttle valve is attached, to a throttle body such that the throttle valve is installed within an intake passage of the throttle body, wherein the throttle valve is rotatable in opening and closing directions with respect to the throttle body;
- affixing a fully closed opening angle restricting member to an attachment part of the throttle shaft while the throttle valve is in a fully closed angle position, and while the fully closed opening angle restricting member is in a position where the fully closed opening angle restricting member abuts a full-close stopper of the throttle body;
- rotatably mounting a throttle gear on the throttle shaft along with a spring which biases the throttle gear to a predetermined initial opening angle position;
- wherein a stopper member provided at the spring abuts an initial-open stopper of the throttle body, wherein the initial-open stopper restricts the stopper member from rotating past an initial opening angle of the stopper member; and
- fixing an initial opening angle restricting member of the throttle gear to the attachment part of the throttle shaft in a position where the stopper member abuts the initial-open stopper,
- wherein the attachment part has a circular shaft shape and the fully closed opening angle restricting member and the initial opening angle restricting member each have a fixed portion having a hole configured such that the attachment part of the throttle shaft is inserted into the hole in a rotatable manner before being fixed to the attachment part, and
- the fixed portion of the fully closed opening angle restricting member is fixed at a predetermined angle independently of the fixed portion of the initial opening angle restricting member and the fully closed opening angle restricting member and the initial opening angle restricting member are fixed independently of each other at predetermined angles to the attachment part of the throttle shaft.

3. A method for manufacturing a throttle device comprising the steps of:
- rotatably mounting a throttle shaft, to which a throttle valve is attached, to a throttle body such that the throttle valve is installed within an intake passage of the throttle body, wherein the throttle valve is rotatable in opening and closing directions with respect to the throttle body;
- abutting the throttle valve to an inner wall of the intake passage;
- abutting a fully closed opening angle restricting member to a full-close stopper of the throttle body, wherein the fully closed opening angle restricting member is rotatably attached to the throttle body;
- rotating the throttle valve to such an open angle corresponding to a sum of angles of a fully closed opening angle and an initial opening angle from a state where the throttle valve is abutted to the inner wall of the intake passage, wherein the fully closed opening angle corresponds to a nonzero opening angle of the throttle valve when the fully closed opening angle restricting member abuts the full-close stopper on the throttle body, and the initial opening angle corresponds to an opening angle of the throttle valve when no external force is applied to the throttle shaft;
- rotatably mounting a throttle gear on the throttle shaft along with a spring that biases the throttle gear to an initial opening angle;
- arranging the spring such that a stopper member provided at the spring abuts an initial-open stopper of the throttle body wherein the initial-open stopper restricts the stopper member from rotating past an initial opening angle of the stopper member; and
- fixing an initial opening angle restricting member and the fully closed opening angle restricting member to the throttle shaft in a position where the stopper member abuts the initial-open stopper.

4. A method for manufacturing a throttle device comprising the steps of:
- rotatably mounting a throttle shaft, to which a throttle valve is attached, to a throttle body such that the throttle valve is installed within an intake passage of the throttle body, wherein the throttle valve is rotatable in opening and closing directions with respect to the throttle body;
- rotatably mounting a fully closed opening angle restricting member on an attachment part of the throttle shaft;
- rotating the throttle valve to a fully closed angle, and abutting the fully closed opening angle restricting member to a full-close stopper of the throttle body;
- rotating the throttle valve to an initial opening angle while the throttle shaft and the fully closed opening angle restricting member are maintained in a relatively non-rotatable manner, wherein the initial opening angle corresponds to an opening angle of the throttle valve when no external force is applied to the throttle shaft;
- rotatably mounting a throttle gear on the throttle shaft along with a spring which biases the throttle gear to the initial opening angle;
- arranging the spring such that a stopper member of the spring abuts an initial-open stopper of the throttle body while the throttle valve is in the initial opening angle position, wherein the initial-open stopper restricts the stopper member from rotating past an initial opening angle of the stopper member; and
- fixing the fully closed opening angle restricting member and an initial opening angle restricting member of the throttle gear to the attachment part of the throttle shaft;
- wherein the attachment part has a circular shaft shape and the fully closed opening angle restricting member and the initial opening angle restricting member each have a fixed portion having a hole configured such that the attachment part of the throttle shaft is inserted into the hole in a rotatable manner before being fixed to the attachment part, and
- the fixed portion of the fully closed opening angle restricting member is fixed at a predetermined angle independently of the fixed portion of the initial opening angle restricting member and the fully closed opening angle restricting member and the initial opening angle restricting member are fixed independently of each other at predetermined angles to the attachment part of the throttle shaft.

5. A method for manufacturing a throttle device comprising the steps of:

mounting a rotatable throttle shaft, to which a throttle valve is attached and can be rotated simultaneously with, to a throttle body such that the throttle valve is installed within an intake passage of the throttle body;

rotatably mounting a throttle gear on the throttle shaft along with a spring which biases the throttle gear to a predetermined initial opening angle;

arranging a stopper member of the spring such that it abuts an initial-open stopper on the throttle body, wherein the initial-open stopper restricts the stopper member from rotating past an initial opening angle of the stopper member;

rotating the throttle valve to a fully closed angle while the throttle shaft and an initial opening angle restricting member of the throttle gear are maintained in a relatively non-rotatable manner;

arranging a fully closed opening angle restricting member, which is rotatably mounted on an attachment part of the throttle shaft, such that it abuts a full-close stopper of the throttle body while the throttle valve is in the fully closed angle position; and fixing the fully closed opening angle restricting member and the initial opening angle restricting member to the attachment part of the throttle shaft, wherein the attachment part has a circular shaft shape and the fully closed opening angle restricting member and the initial opening angle restricting member each have a fixed portion having a hole configured such that the attachment part of the throttle shaft is inserted into the hole in a rotatable manner before being fixed to the attachment part, and the fixed portion of the fully closed opening angle restricting member is fixed at a predetermined angle independently of the fixed portion of the initial opening angle restricting member and the fully closed opening angle restricting member and the initial opening angle restricting member are fixed independently of each other at predetermined angles to the attachment part of the throttle shaft.

6. A throttle device comprising:

a throttle body with a hollow cylindrical intake passage;

a throttle valve with a circular shape of approximately the same diameter as the diameter of the hollow cylindrical intake passage, the throttle valve being disposed in said intake passage for opening and closing the intake passage;

a cylindrical throttle shaft rotatably arranged on the throttle body such that it is integrally formed with and rotates simultaneously with the throttle valve;

a circular throttle gear affixed to a head of the throttle shaft orthogonal to the longitudinal axis of said shaft, wherein the head is a cylindrical extension at the vertical upper end of the throttle shaft concentric about the longitudinal axis of the shaft, wherein the head has a smaller radius than the shaft, wherein said circular throttle gear rotates in opening and closing directions and is engaged by a counter gear, which is in turn connected to an output shaft of a motor;

a spring that biases the throttle gear to a predetermined initial opening angle;

a full-close stopper provided as a recess or a protrusion on the throttle body to restrict the throttle gear from rotating past a fully closed angle;

an initial-open stopper provided as a protrusion on the throttle body to restrict a stopper member of the spring from rotating past an initial opening angle of the stopper member;

a fully closed opening angle restricting member provided as an upside down L-shaped portion containing a hole so as to be fitted around the head of the throttle shaft, wherein the fully closed opening angle restricting member can abut the full-close stopper by having the bottom of the L-shape coming in contact with the recess or protrusion of the full-close stopper; and an initial opening angle restricting member provided in the form of a circular ring fixedly attached via welding to the throttle shaft, in a position where the stopper member of the spring can abut the initial-open stopper, the head has a circular shaft shape to which the fully closed opening angle restricting member and the initial opening angle restricting member are attached, and the fully closed opening angle restricting member and the initial opening angle restricting member each have a fixed portion having a hole configured such that the attachment part of the throttle shaft is inserted into the hole in a rotatable manner before being fixed to the attachment part, and the fixed portion of the fully closed opening angle restricting member is fixed at a predetermined angle independently of the fixed portion of the initial opening angle restricting member and the fully closed opening angle restricting member and the initial opening angle restricting member are fixed independently of each other at predetermined angles to the attachment part of the throttle shaft.

7. The throttle device of claim 6 wherein:

the fully closed opening angle restricting member is welded to the head of the throttle shaft, wherein the fully closed opening angle restricting member comprises a bulge portion at the location where it is welded to said shaft, wherein there is a vertical clearance between the initial opening angle restriction member and the fully closed opening angle restricting member, to accommodate the bulge portion of welding where the fully closed opening angle restricting member is adhered to the head of the throttle shaft.

* * * * *